Oct. 31, 1933.    W. W. PAGON ET AL    1,933,182
VALVE
Filed Sept. 19, 1929    2 Sheets-Sheet 1

Inventors
W. W. PAGON
AND W. W. TROXELL
By Semmes & Semmes
Attorneys

Oct. 31, 1933.  W. W. PAGON ET AL  1,933,182
VALVE
Filed Sept. 19, 1929  2 Sheets-Sheet 2
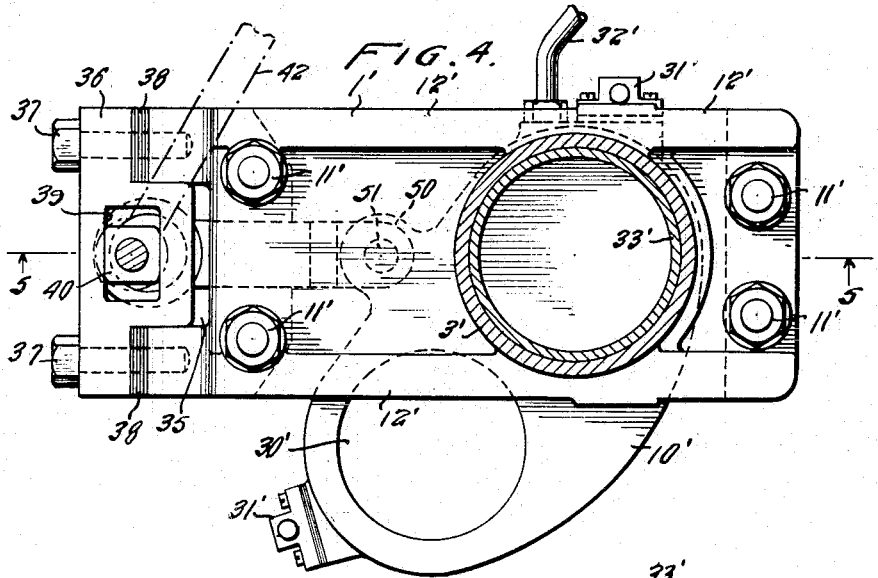
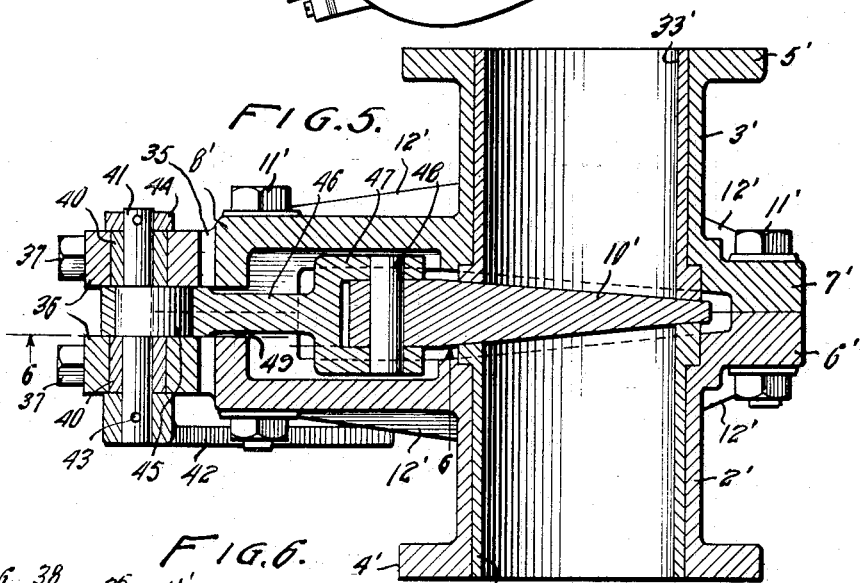
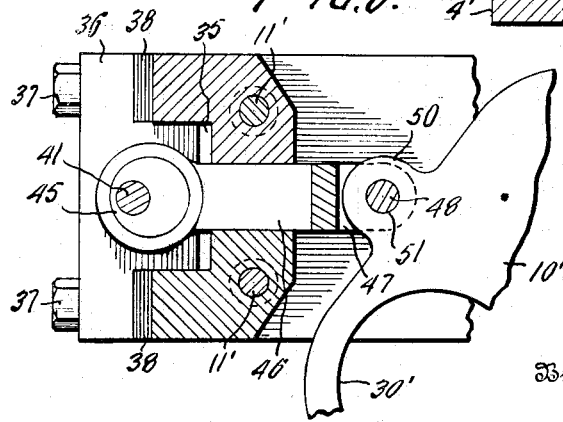

Patented Oct. 31, 1933

1,933,182

UNITED STATES PATENT OFFICE 1,933,182

VALVE

William W. Pagon and Willard W. Troxell, Baltimore, Md., assignors, by mesne assignments, to The Oberphos Company, Baltimore, Md., a corporation of Maryland Application September 19, 1929
Serial No. 393,791

8 Claims. (Cl. 251—18)

This invention relates to valves.

Many present day industries find it convenient to convey solids through conduits in a manner similar to that employed for the transportation of liquids and gases. Under certain circumstances the material may be conveyed in a dry condition; under other conditions the material is mixed with a vehicle and conveyed as a suspension, or mixtures of solid, liquid and gas perhaps uniformly mixed as an aerated suspension, perhaps as a suspension inflated to the nature of soap suds, perhaps merely as a wet solid and entrained gas. While it proves economical to convey solids or suspensions of solids, as pointed out above, there are certain difficulties encountered in maintaining desirable operating conditions.

One particular and material disadvantage is encountered in the employment of valves for regulating the flow of the substances. Valves of the plug type may be used in small size installations, but even when so used, soon become clogged and rendered inoperative. In large installations plug type valves become too bulky and cumbersome.

Other types of valves, such as the poppet, globe and needle valves, in which the flowing substance passes between the valve body and the valve seat, are not worthy of consideration for such service, because the seat becomes fouled, preventing a good seal between the valve and its seat. Gate valves of the ordinary sliding gate type have the disadvantage pointed out in connection with the valves just discussed.

Valves of the so-called pivoted gate type may be used with a degree of success, but the several present-day designs of valves of this type are not adequate for all purposes. For instance, many valves of this type cannot be effectively employed where a tight seal is desired. Also, oftentimes when a seal is effected, the operator finds it difficult to break the seal, which may result in damage to the valve.

A major object of the present invention is to devise a valve suitable for use in conduits through which solid materials or solids in fluid suspension are flowing, which is free of the disadvantages hereinbefore pointed out.

An object of this invention is to provide a valve of the gate type in which the conduit may be sealed off at the seats where the valve is, in closed, open or partly opened position, thus preventing fouling of the casing and seats and permitting the casing to be so constructed as to be open and accessible for cleaning at all times, or to permit operation if the seat is fouled.

Another object of this invention is to provide a valve which lacks the disadvantages inherent in valves of this type heretofore developed.

Yet another object of this invention is to provide a valve of the gate type, in which the gate is of a desirable shape, such as a wedge, and which is provided with means for wedging the gate into its seat at any position of adjustment of the gate.

Still another object of this invention is to provide a valve of the pivoted gate type which is resistant to corrosive chemical reagents.

A further object of this invention is to provide a valve capable of being rapidly actuated to instantly open or close the same.

A still further object of this invention is to provide a valve which will effectively serve to control the supply of rock dust and acidulating agent admitted to an autoclave for manufacturing fertilizer and other products.

A still further object of this invention is to provide a valve which may be used to control the flow of any pulverized material and entrained fluid of any absolute pressure.

With these and other objects in view, which may be incident to our improvements, the invention consists in the parts and combinations to be hereinafter set forth and claimed, with the understanding that the several necessary elements comprising our invention may be varied in construction, proportions and arrangement without departing from the spirit and scope of the appended claims.

The present invention contemplates providing a valve of a novel type in a conduit for conveying solid or a suspension of solid material in a vehicle. A valve construction in accordance with this invention comprises a casing-like member so designed and constructed as to provide a pair of spaced valve seats. The casing member is provided with a displaceable member or members, operable to open or close the valve. The displaceable section of the valve may comprise a solid plate and an apertured plate or a single plate having a solid and an apertured section which may be moved into tightly abutting relationship to the valve seats to form either a sealed blank or a sealed opening. The displaceable member or members may operate by oscillatory or reciprocating linear or rotary motion or by any variation or combination of these. As will be disclosed hereinafter, this assemblage provides a valve which is sealed at the seat in either the open or partly open or closed position, or all positions, and thus renders a casing unnecessary. With such a construction therefore the valve seats and sealing plate or plates are at all times readily accessible for cleaning.

In order to make our invention more clearly understood, we have shown, in the accompanying drawings, means for carrying the same into practical effect without limiting the improvements in their useful applications to the particular constructions which, for the purpose of explanation, have been made the subject of illustration.

In the drawings:

Figure 4 is an end elevation of a valve constructed in accordance with a modified form of our invention.

Figure 5 is a sectional view taken on line 5—5 of Figure 4.

Figure 6 is another sectional view taken on line 6—6 of Figure 5.

Figure 1:
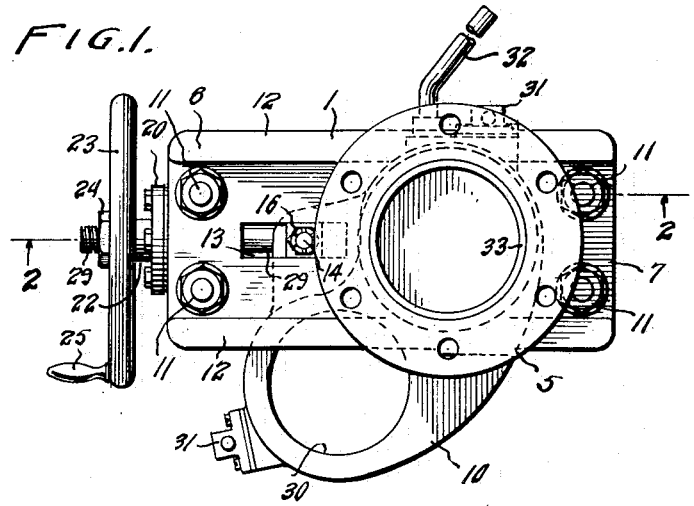
Figure 1 is an end elevation of a valve constructed in accordance with the present invention.

In the drawings, in which similar reference numerals indicate similar parts throughout, several valves such as are contemplated by this invention are shown. Valve 1 comprises a casing formed of two similar sections, 2 and 3, provided with attaching flanges 4 and 5. The sections also have flanges 6 and 7, by means of which the several sections are secured together to form the valve casing. These flanges extend a short distance from one portion of the sections and extend from the sections in the opposite direction, as shown in the drawings, to provide a superstructure 8 for supporting the valve body and its actuating mechanism, to be hereinafter described.

The flanges 6 and 7 have offset portions 9 adapted to abut in order to space the adjacent end faces of the sections 2 and 3 apart a distance sufficient to allow the valve body 10 to swing freely therebetween. Suitable bolts or other securing means 11 extend through the flanges to maintain the sections in assembled relation. To effect rigidity of the flanges 6 and 7, suitable reinforcing ribs 12 are formed on the several sections.

Provided in the superstructure 8 are a plurality of slots or guideways 13, in which a floating pin 14 is freely and slidably mounted. Bushings or blocks 15 are mounted upon portions of the floating pin so as to bear against or engage the sides of the slots or guideways 13. If desired, of course, these bushings may be in the form of rollers. The ends of the floating pin are screw-threaded and are adapted to receive nuts 16, so as to maintain the bushings on the floating pin within the guideways.

Figure 2:
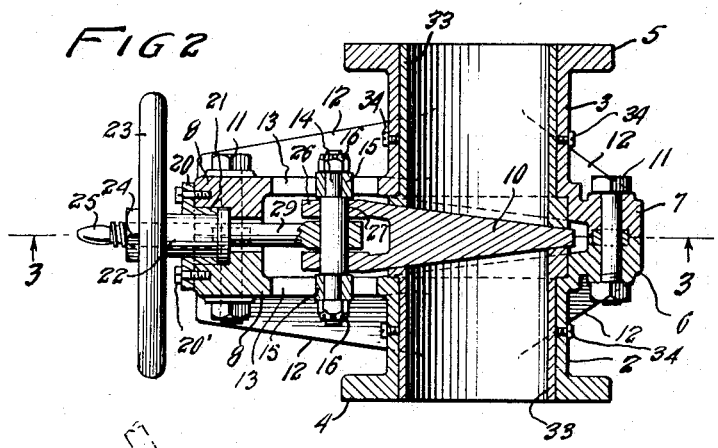
Figure 2 is a sectional view taken on line 2—2 of Figure 1, showing the constructional details of the valve.
Figure 3:
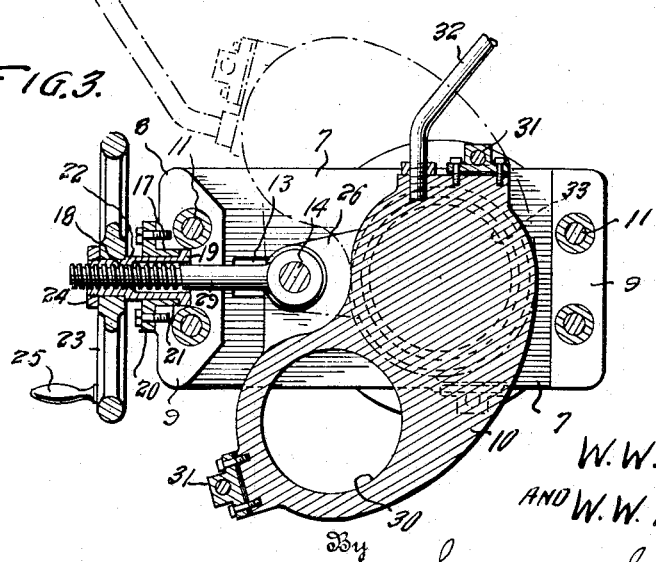
Figure 3 is a sectional view taken on line 3—3 of Figure 2.

As it may be observed in Figures 2 and 3, the offset portion 9 of the superstructure is provided with a recess 17 surrounding an opening, in which a threaded eyebolt 29 is loosely mounted. An internally screw-threaded bushing 18 is adapted to have one of its ends received within the recess 17. It should be noted that the end of the bushing 18 received in the recess is provided with a flange 19. In order to maintain the bushing 18 within the recess, an annular securing ring 20, having a downwardly extending flange 21, is employed. The flange 21 surrounds the bushing 18 and cooperates with flange 19 to retain the bushing within the recess. The annular securing member is fastened to the superstructure by any suitable securing means 20'.

Flange 21 of the annular securing member retains the bushing 18 securely in place, but it should be noted that this fit is loose enough so as to allow free rotation of the bushing without binding.

As shown in the drawings, the free end of the bushing is of reduced size and externally screw-threaded for a short distance. An operating or hand wheel 23 is mounted on the reduced portion of the bushing abutting shoulder 22. The operating wheel is secured on the bushing by means of a nut or other suitable retaining means 24. An actuating handle 25 is provided upon the wheel so it may be rapidly and easily rotated.

By inspection of Figure 2 it may be seen that the valve body 10 extends between the end faces of the sections 2 and 3. The valve body 10 is provided with a bifurcated portion, by means of which it is secured to an actuating element. The arms or lugs 26 of the bifurcated portion of the valve body 10 are apertured to receive the floating pin 14. With this construction the valve body may be freely swung between the end faces of the sections 2 and 3.

Mounted between the arms or lugs 26 of the bifurcated portion of the valve plate 10 is the eye portion of the eye bolt-like shifting member 29. The internal diameter of the opening in the eye is sufficient to allow the pin 14 to loosely pass therethrough. The other end of the shifting member is externally screw-threaded and is adapted to engage with the internal screw threads of the bushing 18.

As is shown in Figure 1 and Figure 3, the side elevation of valve plate 10 is of a kidney shape. However, we wish it to be understood that the invention is not limited to the shape of valve. Obviously valve plates having different curvilinear outlines may be employed as evidenced by the modification shown in Figure 4. While the valve plate or body has been shown constructed of a single piece of material, it should be noted that it is within the contemplation of the present invention to construct the valve body of a plurality of parts. For instance, it may be formed of a pair of plates having an interposed wedge therebetween.

The valve plate 10 is provided at one of its ends with a circular opening 30, the diameter of which is equal to the bore of the casing sections. However, if it is desired, this bore may be constructed of a smaller diameter. If desired, other openings of any suitable size may be formed in the valve plate.

In certain installations it is advantageous to operate the valve to rapidly move it from full open position to full closed position and vice versa. In order to prevent the valve body being moved past an extreme position, suitable stops 31 are provided. The stops may be fastened to the valve body in any suitable manner as, for example, by screws such as shown in the drawings.

As is clearly shown in Figure 2, a cross section through the valve plate is of wedge-like formation. It should be noted that the gap between the sections is of greater width at one edge than at the other and tapers at an angle equal to that of the taper of the wedge-shaped valve body. This construction is provided in order to take care of the wedge-like shape of the valve plate and to effect a seal between the valve and its seat.

It will be appreciated that by tapering the end of each of the sections 2 and 3, a pair of inclined faces are provided, which cooperate to form a seat for the valve body. If desired, the seat of the valve may be faced with material which will be sufficiently corrosion-resistive to afford a good seal between the valve and its seat.

When the valve is to be employed in installations for conveying corrosive material the valve casing may be lined with any metal or alloy which is resistant to the corrosive action of the particular material handled. Should the valve be employed where it will come in contact with sulphuric acid we have found that a lining of an antimony-lead alloy is very satisfactory. As shown in the drawings, the lining is detachably held in the sections of the valve casing by the set screws 34, although any other attaching means may be employed. This construction permits the lining to be removed and replaced when necessary, thus increasing the active life of the valve.

As illustrated, the corrosion resistive lining may also serve as a facing material for the valve seat. In such arrangements the seat facing may be replaced by replacing a lining for the valve casing. While reference has been made to a corrosion-resisting lining, it should be clearly understood that corrosion-resisting coatings or platings may be employed for protecting the valve against corrosion. For instance, calorizing is found desirable in certain cases. It is also within the scope of the present invention to protect the valve body by plating, coating or otherwise preventing the access of the corrosive material thereto.

Whereas the parts of the valve structure have been described as being protected against corrosion, it should be clearly understood that the present invention also contemplates forming all of the valve parts of material which has corrosion-resisting properties.

Assuming the valve to be in a closed position, as shown in Figure 3, the operation thereof is as follows: The operating handle 23 is turned in such a direction as to withdraw the wedge-like valve plate 10 from its seat formed by the abutting casing sections. This operation necessarily is continued until the valve is moved sufficiently to permit it to freely swing about the floating pin 14 as a pivot. By exerting force upon the actuator or handle 32, the valve plate may be swung to the position indicated by the dotted lines. The stop 31 adjacent to the opening 30 prevents the valve from being moved entirely within the casing section. In this position the opening 30 is in coincidence with the bore of the casing section and full flow through the valve is allowed. Having opened the valve, the operating handle is turned in the opposite direction so as to reseat the valve plate and lock it in position by wedging it between the end faces of the valve casing. Obviously the valve body may be placed and located in any desired position so that either partial or full flow may be obtained.

When it is desired to close the valve, the operating wheel is rotated to move it from its seat. The actuating handle 32 is moved to the closing position, and the actuating wheel is then rotated in the reverse direction, so as to firmly seat and lock the valve in its closed position.

Shown in Figures 4 to 6 inclusive is a modified form of the invention. The essential difference between this modification and the embodiment disclosed in Figures 1 to 3 inclusive resides in the formation of the superstructure and the actuating mechanism for the valve. Similar to the first form of the invention the valve casing sections are provided with a superstructure 8'. Upon the end of each section of the superstructure 8' there is provided a rectangular recess 35, adapted to receive a projecting portion of a bearing member 36. The bearing supports 36 are secured to the superstructure by any convenient method such as bolts 37. Positioned between the bearing supports 36 and the top of the superstructure are wear adjustment shims 38, the purpose of which will appear hereinafter. Rectangular-shaped slots 39 are formed in the bearing supports and are adapted to receive sliding blocks 40, which are apertured and serve as bearings for a pin or shaft 41. The bearing blocks 40 are freely slidable in the slots, the amount of movement being limited by the length of the rectangular slots 39.

Bearing blocks 40 are bored to receive a shaft 41, which extends through the bearings and superstructure. Upon one end is mounted an operating handle 42, secured to the shaft 41 in any desired manner as, for example, a pin 43. Upon the other end of the shaft is a suitable securing collar 44 to retain the shaft in position and which may be secured to the shaft in a manner similar to the actuating handle 42.

Between the bearing blocks 36 there is fixed upon the shaft 41 an eccentric or cam 45, which is secured upon the shaft 41 by means of a key or other suitable means.

A link or connecting rod 46 is adapted to be mounted at one end upon the cam or eccentric 45. Link 46 extends through an opening 49 in the end portion of the superstructure which serves as a guide for the member 46. The other end of the link 46 is bifurcated to form two arms 47, through which extends a pin 48.

A valve plate 10' of construction similar to that described in the device illustrated in Figures 1 to 3 inclusive, is pivotally mounted on the pin 48 carried by the bifurcated end of the member 46. This connection is accomplished by forming a lug 50 upon the upper portion of the valve plate, provided with an opening 51, through which the pin 48 extends. Thus pin 48 secures the valve plate 10' to the forked end of the link 46 which serves as a shifting member.

It has been pointed out that the essential difference between the construction shown in Figures 4 and 6 inclusive and that shown in Figures 1 to 3 inclusive resides in the formation of the superstructure and the actuating mechanism for the valve. The other structure is substantially the same as that shown in the first three figures, similar parts being indicated by similar reference numerals, primed.

The valve plate 10' may be constructed as described in connection with valve 10 and is provided with an actuating handle 32' for swinging it about its pivot, that is, about the pin 48.

From the foregoing description it will appear that upon proper movement of the lever 42, the eccentric 45 will be rotated and, because of its eccentric mounting, will cause the portion of the shifting member surrounding it to be moved.

At the same time there will be a tendency for the shifting link 46 to move to one side of the center line of the valve casing sections. Such movement is, however, prevented. In order to permit the proper operation of the structure the sliding bearing blocks 40 are provided. Movement of the lever 42 causes the bearing blocks 40 to shift to one side of the valve casing center line.

Since the valve shifting member 46 is moved, the valve plate 10' connected thereto is also moved. This results in withdrawing the wedge-like valve plate 10' from the seat provided between the abutting valve casing sections. When shifted a sufficient distance the valve plate 10' is free to move about the pin 48 as a pivot. Assuming that the valve is closed and it is desired to open it, after having shifted the valve off of its seats, the actuator handle 32' is pulled so as to position the opening 30' in coincidence with the bore of the casing sections. To lock the valve plate in this position, the operator handle 42 is moved oppositely, which results in securely wedging the valve in its open position. As described in the previously mentioned embodiment, it is obvious that if desired the valve may be positioned and securely locked so as to give any desired amount of valve opening.

To close the valve, the valve plate is again drawn from its seat by swinging the operator handle 42 in the necessary direction. By impressing a properly directed force upon the actuator handle 32' the valve plate is swung to the closed position and it may be locked by wedging the valve on its seat.

If the valve does not properly seat when the lever 42 is in one extreme position, some of the shims 38 may be removed to secure the proper adjustment. Conversely if the valve does not swing freely, additional shims may be inserted to space the valve from its seat when the lever 42 is in the other extreme position.

While the several valve constructions herein described have been provided with separate means for lifting the valve from its seat and for swinging it to various positions, we wish it to be understood that it is within the scope of the present invention to provide a single actuating mechanism which will seat and unseat the valve and swing it to desired positions.

Also if found necessary, power means may be employed for actuating either of the valve structures.

While the valves have been depicted in one particular position, we wish it to be clearly understood that it may be used in any position found desirable or convenient.

It will be understood also that if desired the valve plate may be moved into the space between the valve seats and such seats thereafter moved to clamp the plate tightly therebetween.

It will likewise be appreciated that if desired the plate or similar element may be replaced by a cock and the contiguous portions of the casing conformed to its outline so as to provide a valve of the type described, sealed off at the seats at open, closed or intermediate position.

From the foregoing description, it may be observed that we have provided a valve of the so-called gate type which lacks the disadvantages inherent in valves of this construction which have heretofore been developed and which is provided with a casing which may be easily cleaned. It may also be observed that we have devised a semaphore type of valve in which the valve plate is in the form of a wedge. Furthermore, it may be seen that a valve mechanism employing abutting valve casing sections held apart in spaced relationship, has been provided. It may also be seen that a simple and effective mechanism for unseating, swinging and reseating a wedge-shaped valve body to any desired position has been constructed.

Moreover, it will appear that we have provided a pivot gate type of valve which is resistant to corrosive chemical re-agents. Further it will appear that we have provided a valve capable of being rapidly actuated so as to instantly open or close the same and which is of simple and inexpensive construction.

The structure herein described presents a valve of the gate type in which its associated conduit may be sealed off at the seats when the valve is in open, closed or intermediate position so as to largely prevent fouling of the casing yet to permit efficient operation even though some fouling occurs. The structure is so designed as to be open and accessible for cleaning at all times.

While we have shown and described the preferred embodiment of our invention, we wish it to be understood that we do not confine ourselves to the precise details of construction herein set forth, by way of illustration, as it is apparent that many changes and variations may be made therein by those skilled in the art without departing from the spirit of the invention or exceeding the scope of the appended claims.

We claim:

1. A valve structure comprising valve casing sections, a valve plate mounted to swing therebetween, said plate being of wedge-like formation, a seat for said plate, means for swinging the valve plate to predetermined positions and other means for wedging the plate in positions on the seat.

2. A valve structure comprising valve casing sections, a valve plate mounted to swing therebetween and having an opening formed in one portion thereof adapted to align with a bore in the valve casing sections, means for swinging said plate to any predetermined position to vary the degree of opening and means for lifting the plate to permit free swinging thereof and for lowering it to lock the plate in any of said adjusted positions.

3. A valve structure comprising a pair of valve casing sections arranged in spaced-apart relation, a superstructure associated therewith, a valve plate between said casing sections, a floating pin adjustably mounted in said superstructure, said valve plate being pivotally mounted upon said pin so as to allow free swinging movement between the valve sections.

4. A valve structure comprising a pair of valve casing sections arranged in spaced-apart relation, a superstructure associated therewith, a valve plate between said casing sections, a floating pin mounted in said superstructure, said valve plate being pivotally mounted upon said floating pin and means for raising the floating pin to unseat said valve to permit it to be shifted.

5. A valve structure comprising a pair of valve casing sections arranged in space-apart relation, a superstructure associated therewith, a valve plate mounted between said casing, a floating pin mounted in said superstructure, said valve plate being pivotally mounted upon the floating pin, means for raising said pin and means for swinging the valve plate to a predetermined position.

6. A valve structure comprising adjoining valve casing sections provided with a superstructure, a floating pin mounted therein, a valve plate adapted to pass between said casings and to be swingably mounted upon said pin, a rotatable internally screw-threaded member mounted upon the top of said superstructure, a connecting screw-threaded arm adapted to be enthreaded in said member, said arm being secured to said floating pin and means for rotating said member so as to raise and lower the valve plate.

7. A valve structure comprising a pair of valve casing sections arranged in spaced-apart relation, a superstructure associated with said valve casing sections, a valve plate swingably mounted between said casing sections and supported by said superstructure, a floating pin adjustably mounted in said superstructure and which pivotally supports the valve plate and cam-like means for moving said floating pin.

8. A valve structure comprising a pair of valve casing sections arranged in spaced-apart relation, a superstructure associated with said valve casing sections, a valve plate swingably mounted between said casing sections and supported by said superstructure, a floating pin adjustably mounted in said superstructure and which pivotally supports the valve plate, said plate being of wedge-like formation and cam-like means for actuating said floating pin to wedge said valve into its seat.

WILLIAM W. PAGON.
WILLARD W. TROXELL.